(12) United States Patent
Kuwabara

(10) Patent No.: US 6,509,907 B1
(45) Date of Patent: Jan. 21, 2003

(54) PERSONAL COMMUNICATION TERMINAL WITH VARIABLE SPEED SCROLL DISPLAY FEATURE

(75) Inventor: Tatsuru Kuwabara, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/465,214

(22) Filed: Dec. 15, 1999

(30) Foreign Application Priority Data

Dec. 16, 1998 (JP) .......................................... 10-357723

(51) Int. Cl.⁷ .................................................. G09G 5/34
(52) U.S. Cl. ...................................... 345/684; 345/685
(58) Field of Search ................................ 345/123, 124, 345/125, 341, 684, 685

(56) References Cited

U.S. PATENT DOCUMENTS

| | | | | |
|---|---|---|---|---|
| 4,660,032 A | * | 4/1987 | Tsunoda | 340/825.44 |
| 4,952,927 A | * | 8/1990 | DeLuca et al. | 340/825.44 |
| 5,602,566 A | | 2/1997 | Motosyuku et al. | |
| 5,872,521 A | * | 2/1999 | Lopatukin et al. | 340/825.44 |
| 5,923,327 A | * | 7/1999 | Smith et al. | 345/341 |
| 5,929,927 A | * | 7/1999 | Rumreich et al. | 348/563 |
| 6,147,670 A | * | 11/2000 | Rossmann | 345/123 |
| 6,201,526 B1 | * | 3/2001 | Burgan | 345/124 |

FOREIGN PATENT DOCUMENTS

| | | |
|---|---|---|
| JP | 5-235830 | 9/1993 |
| JP | 7-064754 | 3/1995 |
| JP | 7-240953 | 9/1995 |
| JP | A-11-184433 | 7/1999 |
| JP | A-11-184452 | 7/1999 |

* cited by examiner

Primary Examiner—Matthew Luu
(74) Attorney, Agent, or Firm—Harness, Dickey & Pierce, PLC

(57) ABSTRACT

A communication terminal having a display capable of scrolling a text message at variable speeds to thereby enhance message readability. A display of 6 full-size characters×3 lines for displaying a character message is provided on the portable telephone. Tactile sensors for changing scroll display speed are provided on the sides of the portable telephone. The top of a long text message is paused for two seconds, and then vertically scrolled on the display. While the message is scrolled at a speed of 1 dot per 20 ms during normal operation, the display scrolling speed is changed to 1 dot per 60 ms when the tactile sensor is manipulated. The message is paused for 0.7 seconds every time one line of the message has completed scrolling. When the end of the message is reached, it is displayed for 1 second.

7 Claims, 4 Drawing Sheets

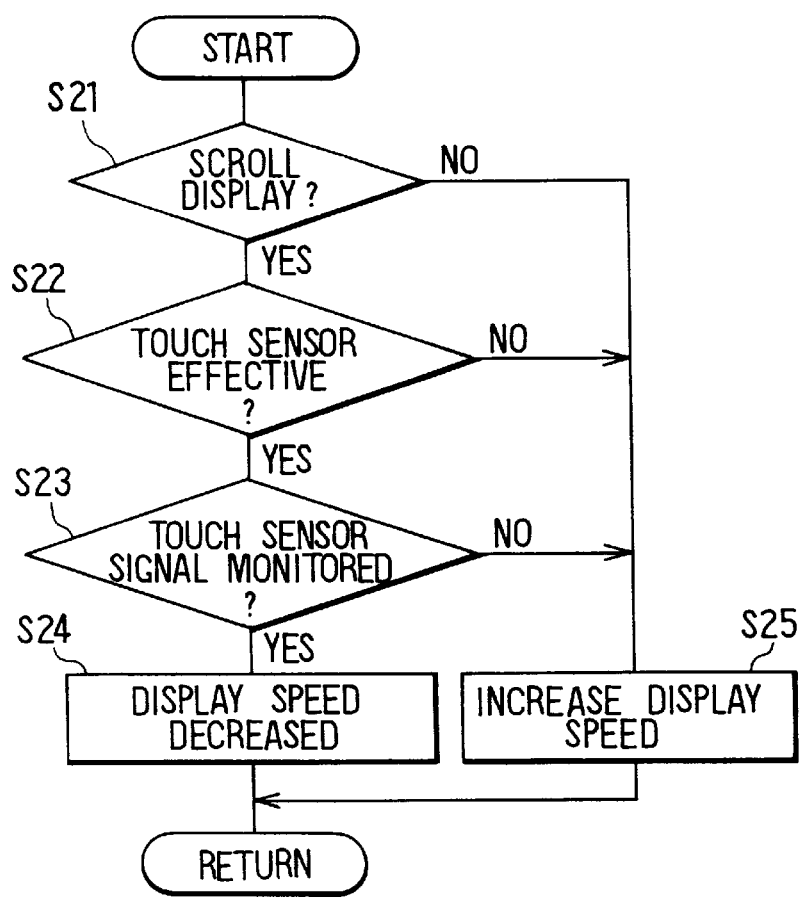
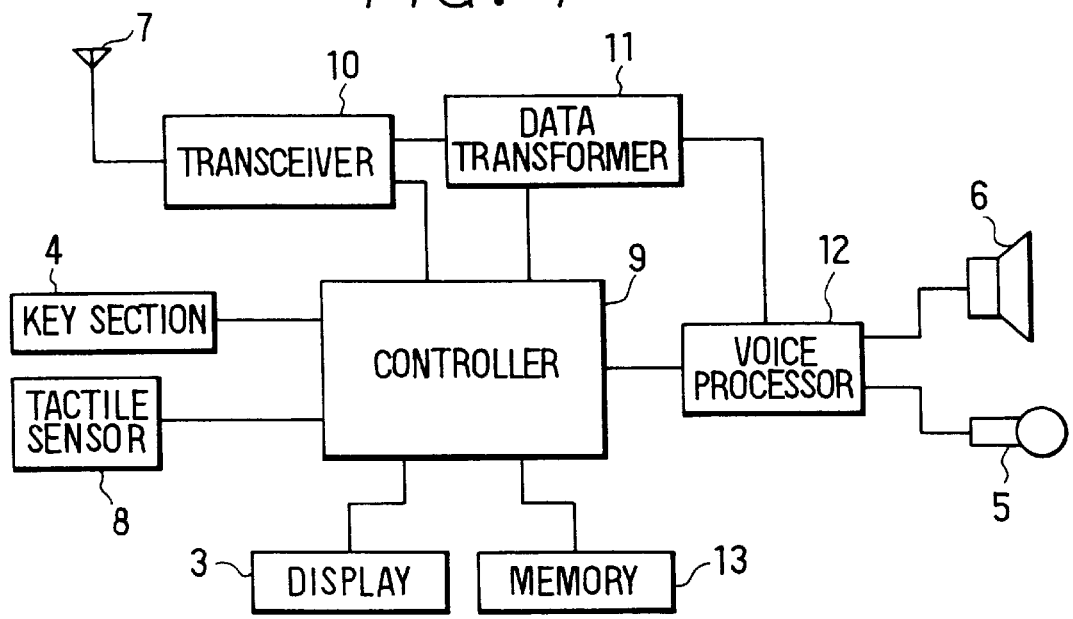

PERSONAL COMMUNICATION TERMINAL WITH VARIABLE SPEED SCROLL DISPLAY FEATURE

CROSS-REFERENCE TO RELATED APPLICATION

The present application is related to, and claims priority from, Japanese Patent Application Serial No. Hei. 10-357723, the contents of which are incorporated herein by reference.

BACKGROUND OF THE INVENTION

1. Field of the Invention

The present invention relates to portable communication terminals, and particularly to a portable communication terminal having a scrolling character message display.

2. Description of the Related Art

Many conventional portable telephones have the ability to send, receive and display text messages on a liquid crystal display (LCD). However, because the telephones are portable, the display is relatively small and thus the amount of text displayed at one time is typically limited to about 6 characters (in the case of full-size Japanese characters) on 3 lines. Therefore, in the case of a long text message, such displays have been configured to initially display the top three lines on the display section, and then to advance to the next three lines in response to user manipulation of a cursor key. However, manipulation of such displays is cumbersome, as the user must manipulate the cursor key many times in order to read the long character message.

Recently, displays have been introduced in which text messages on the display are scrolled automatically at a predetermined rate. Such scrolling displays enable a lengthy text message to be displayed without requiring the user to manipulate the cursor key as described above.

However, a user may want to slow down the display scroll speed if the speed is too fast or if there is a part of the message that is difficult to read. However, if the scroll speed is fixed as described above, the user is unable to adjust it. As a result, although it is conceivable to allow the user to initially set a preferable scroll display speed, the scroll display speed cannot be changed during display of the character message, thereby resulting in inconvenience to the user.

In addition, the density of the display becomes light due to the reaction speed of the liquid crystal in a smooth scroll LCD. Therefore, although it becomes necessary to enhance the overall display contrast during the scroll display, the overall display quality is lessened, as an active area of the display becomes darker than the surrounding inactive display area, and the boundary between the active and the inactive areas is clearly defined when the display contrast is enhanced.

SUMMARY OF THE INVENTION

The present invention overcomes the above-discussed limitations of conventional portable telephone displays by providing a communication terminal with scrolling display that is readily readable by a user, even when a lengthy text message is displayed.

More particularly, the present invention provides a portable communication terminal having a display in which a displayed character message is vertically scrolled. The scroll display speed may be changed by the user as the message is being scrolled based on user commands. Consequently, the user can change the scroll display speed freely while reading the message.

In addition, the display according to the present invention includes a feature that enables the user to pause the scrolling message for a certain period of time each time the scrolling of one line of text is completed. Therefore, the display may be made more readable than a continuously scrolling display. Also, even when the display is an LCD, the display contrast need not be adjusted, as a fully dense display is achieved when the scrolling message is paused.

The communication terminal also includes tactile sensors for changing the scroll display speed when manipulated by the user. The tactile sensors may be located on the terminal at a user holding position to simplify operation.

The specific nature of the invention, as well as other objects, uses and advantages thereof, will clearly appear from the following description and from the following drawings.

BRIEF DESCRIPTION OF THE DRAWINGS

FIG. 2 is a flow diagram showing the methodology utilized for changing the display scroll speed;

FIG. 4 is a block diagram of the electrical components of the portable telephone of FIG. 3.

DETAILED DESCRIPTION OF THE PREFERRED EMBODIMENTS

Figure 3:
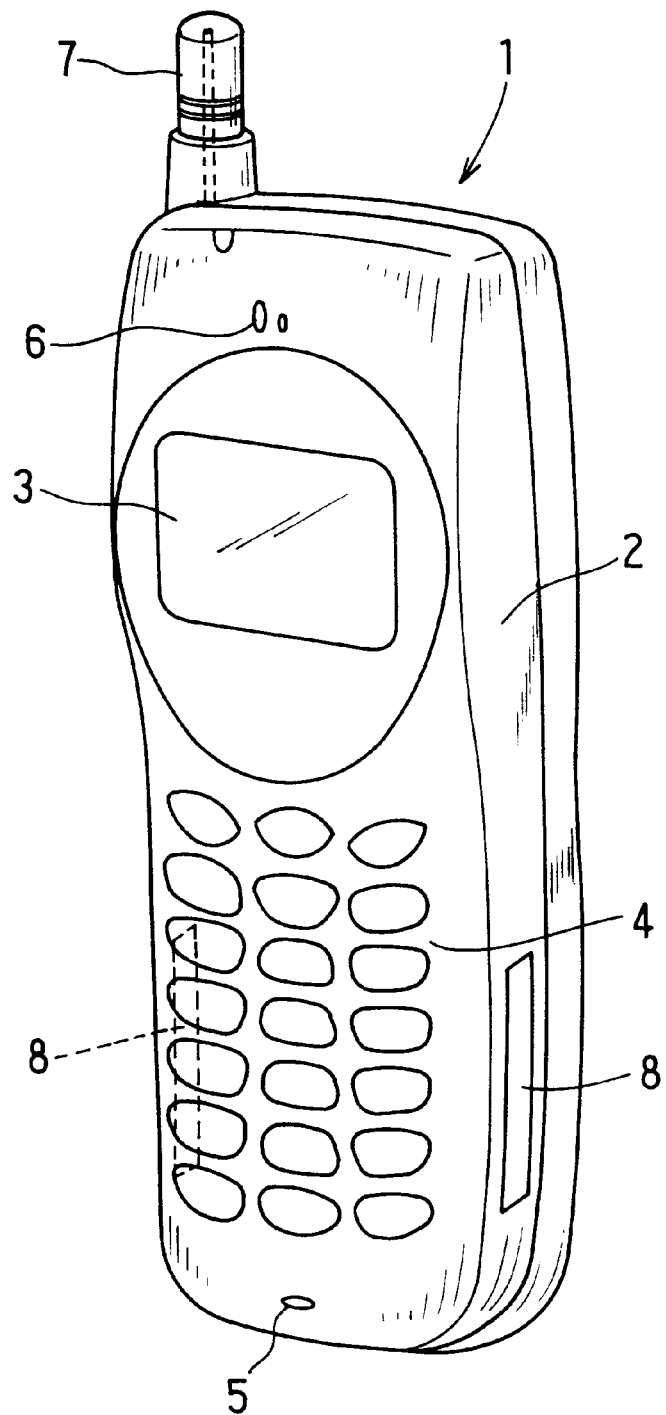
FIG. 3 is a perspective view showing the a portable telephone including the display of the present invention.

One embodiment in which the invention is applied to a portable telephone having the capability of sending/receiving a text message (mail) will be explained below with reference to the drawings. FIG. 3 shows a communication terminal 1 of the present embodiment in the form of a portable telephone. Here, a body 2 of the portable telephone 1 has a vertically elongated shape, and can be held with one hand. It is provided with a display 3 at an upper portion of its front surface and a key section 4 at a lower portion thereof. A microphone 5 for voice input is also provided at the front surface lower portion of the body 2, and a speaker 6 for voice output is provided at the front surface upper portion of the body 2. A communication antenna 7 capable of being extended and retracted is provided at a top edge surface of the body 2.

The display section 3 is preferably an LCD which is capable of displaying either Japanese kanji or roman characters, for example, as well as telephone numbers and text messages. In the exemplary LCD shown, one line at the top stage in the display section 3 is fixed as a guide display line for displaying remaining battery power, usage mode, signal strength, menu being executed, presence of received mail, and/or other status indicators as shown in FIGS. 5A–5E. Preferably, the display is capable of displaying a text message in three lines under the guide display line. More specifically, the text message is displayed in a display area of 6 characters ×3 lines with 12 dot ×12 dot resolution. Half-size characters may be used for Japanese Kana characters, alphanumeric characters and symbols. It is noted that a margin of one dot is provided between the lines and between the characters.

Further, although not explained in detail, a large number of keys such as an End/Power Source key, a Start key, a Menu key, Up/Down cursor keys, a Memory key, a Mail key, a plurality of dial keys corresponding to numerals and characters, a Clear key, a Function key, a Voice Memo key and others are provided on the key manipulating section 4.

According to the present embodiment, a pair of capacitance-type tactile sensors 8 for example are provided at the lower part of the right and left side portions of the body 2, i.e., at the portion where the user holds the body 2. As described later, the tactile sensors 8 are for changing the display scroll speed and operate only when the user touches both tactile sensors 8 with a relative amount of force. Accordingly, the tactile sensors 8 do not operate when the user holds the body 2 loosely.

Referring to FIG. 4, the communication terminal also includes a controller 9 primarily including a microcomputer for controlling the overall system, a transceiver 10, a data transformer 11 and a voice processor 12 within the body 2. The microphone 5 and the speaker 6 as well as the data transformer 11 are connected to the voice processor 12. The transceiver 10 is connected to the data transformer 11 and the antenna 7 is connected to the transceiver 10.

The controller 9 receives a control signal from the key section 4 and a signal from the tactile sensors 8 and controls the display 3 based on the received signals. The controller 9 is also connected to a memory 13 comprising, for example, an EEPROM and a VRAM. The memory 13 stores a communications control program as well as various data such as text data.

Thus, the communication unit of the present invention is capable of normal telephone (speech) functions as well as sending/receiving text messages (mail) through commercially available mail options known, for example, in Japan as "Sky Walker", "Puchi-Mail", "Short Mail" and "A-Mail". The text message transceiving function is a function for sending text data, created by the user by manipulating the key section 4, to another portable telephone 1, for receiving a text message from another portable telephone, and for storing data in the memory 13 or displaying the data on the display section 3 while allowing the user to freely retrieve it. It should be noted that one character message is typically limited to 192 full-size characters.

According to the present embodiment, when the character message is long (exceeding the length of three lines in this case), the control circuit 9 implements a smooth scroll display function by vertically scrolling the display of the character message from the bottom of the screen to the top in the 3 line section of the display. As will be described later in detail, the controller 9 always monitors the signal of the tactile sensor 8 during the scroll display, and changes the scroll display speed when the tactile sensors 8 is activated.

Further, according to the present embodiment, the scrolling of the display can be stopped for a certain period of time, e.g., 0.7 seconds, every time one display line is scrolled to the next display line (13 dots including the margin) in the vertical direction is completed. It is noted that the user can select whether the tactile sensors 8 should or should not be activated by setting the respective modes. When it is nullified, the scroll display speed is fixed to the normal speed. The user is also allowed to stop the scroll display, to advance or return the display in units of lines or display pages during the scroll display by manipulating the cursor keys of the key section 4.

Next, the operation of the portable telephone constructed as described above will be explained with reference to FIGS. 1, 2 and 5. The portable telephone 1 is provided with the function for sending/receiving a text message as described above, and the user can thereby create and send a text message to another other portable telephone, or can receive a text message from the other portable telephone. Data of the received text message is stored in the memory 13.

When the user wants to read a received text message, the user selects the mail by selecting it from the Mail Retrieve menu. Then, the controller 9 develops the text message of the selected mail on the VRAM as display data of 6 characters in the horizontal direction. When the character message is long, the controller scrolls the message on the display based on the methodology shown in the flow diagram in FIG. 1. It is noted that the operation will be explained by citing a portion of "WEATHER IS GREAT! LET'S CAMP!" as a message shown in FIGS. 5A–5E.

Figure 5A:
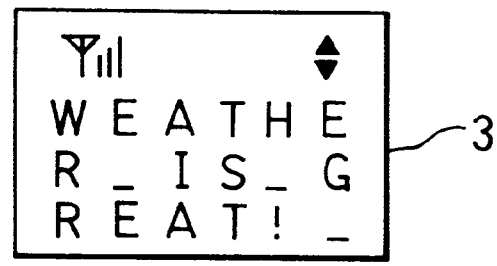
FIGS. 5A–5E show successive images of a scrolling character message on the display shown in FIG. 3.

That is, Steps S1–S4 are relate to the display of the text heading. Initially, the first 6 characters on each of the 3 lines are displayed at Step S1, and an initial display timer is set at Step S2. At this time, the initial display timer is set at 2 seconds for example. Then, the timer is decremented at Step S4 until the timer has timed out (T.O.) at Step S3. Thereby, the top 3 lines, i.e., "The weather is gre" is displayed fixedly on the display section 3 for the first 2 seconds as shown in FIG. 5A.

When the initial text has been displayed for 2 seconds (Yes at Step S4), the display is scrolled at Steps S5–S13. Here, a dot shift counter indicating how many dots the display has been moved (up) is initially cleared at Step S5. Then, the screen display is shifted up by one dot at Step S6, and the dot shift counter is incremented by 1 at Step S7. Next, a scroll timer is set at Step S8 and is decremented at Step S9 until it times out at Step S10. The processes from Step S6 and thereafter are subsequently repeated until the dot shift counter reaches 13 dots equivalent to one line including a margin (No at Step S11).

Figure 5B:
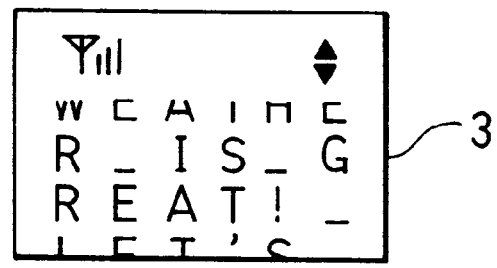

At this time, the scroll timer is set as described later, and is set at 20 ms for example during normal operation (i.e., when the tactile sensor 8 is not activated). Accordingly, one line is smoothly scrolled by moving the text on the display at a relatively fast speed of 1 dot every 20 ms. The display 3 during the scrolling appears as shown in FIG. 5B.

Figure 5C:
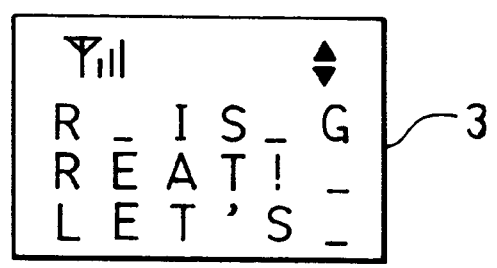
Figure 5D:
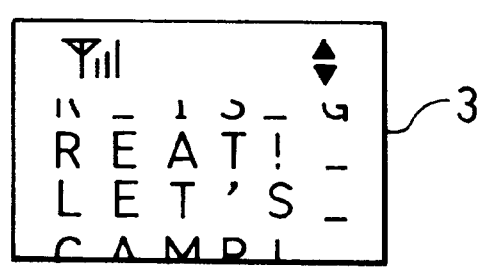
Figure 5E:
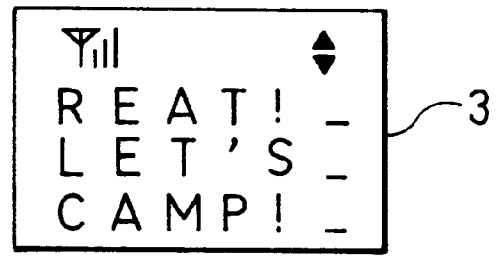

When the vertical scrolling of the 13 dots, i.e., one line, is completed (Yes at Step Sil), the scrolling is stopped for a certain period of time at the following Steps S12–S14. Here, a one-line timer is set at Step S12, and is decremented at Step S13 until it times out at Step S14. In this case, the one-line timer is set at 0.7 seconds, for example, and display scrolling is stopped for a certain period of time, i.e., 0.7 seconds, when the scrolling of one line is completed as shown in FIG. 5C.

Subsequently, it is determined at Step S15 whether or not the stopped display state shows the end of the character message. When the end of the message is not reached (No at Step S15), the above-described scrolling steps are repeated. Thereby, the smooth display scrolling is carried out again (see FIG. 5D) until the end of the character message is reached. Therefore, when the scrolling of the next line on the display is completed, the display is stopped for a certain period of time, i.e., 0.7 seconds (see FIG. 5E).

Thus, the smooth scroll display accompanied with the stop of the display after each line is scrolled is carried out sequentially until the end of the character message appears at the bottom line of the display 3. Then, when the display comes to the state in which the end of the character message is displayed "REAT! LET'S CAMP!" in the example of FIG. 5E) (Yes at Step S15), the processes related to the display of the end are carried out at Steps S16–S18.

In the process, an end display timer is set at Step S16, and subtraction of Step S18 is carried out until the end display timer times out at Step S18. In this case, the end display timer is set at 1 second for example. Thereby, the display 3 is fixed for 1.7 seconds for example for the end of the character message. After that, the processes from Start (Step S1) and thereafter are repeated again unless the user stops the manipulation.

Thus, the smooth scroll display of a text message is carried out at a relatively fast scroll display speed (the scroll timer is set at 20 ms) during normal operation. However, if the user wishes to slow the scrolling speed or when the user wants to slow the scrolling speed when a part of the message is hard to read or an important part appears, he or she may easily do so.

When the user wants to slow down the display scroll speed while reading the message on the display, the user can change and slow down the scroll display speed by manipulating the tactile sensors 8 by firmly gripping the body 2. The user can also return the scrolling speed to its original speed by weakening his or her grip on the body 2. The flow diagram in FIG. 2 shows the processing methodology of the controller 9 at such a time.

It is determined whether or not a message is being scrolled on the display at Step S21. When it is determined that a message is being scrolled, (Yes), it is determined whether or not the tactile sensor 8 is effective at Step S22. When a message is not being scrolled (No at Step S21) or the tactile sensor 8 is nullified due to the mode setting (No at Step S22), the scroll display speed is not changed, and the relatively fast scroll display speed (the scroll timer is set at 20 ms) is kept as is at Step S25.

When the tactile sensor 8 is activated (Yes at Step S22), the signal of the tactile sensor 8 is continuously monitored at Step S23 and the scroll display speed is slowed when the user manipulates the tactile sensor 8 (Yes at Step S24). When the tactile sensor 8 detects no pressure (No at Step S23), the scroll display speed is increased at Step S25.

Figure 1:
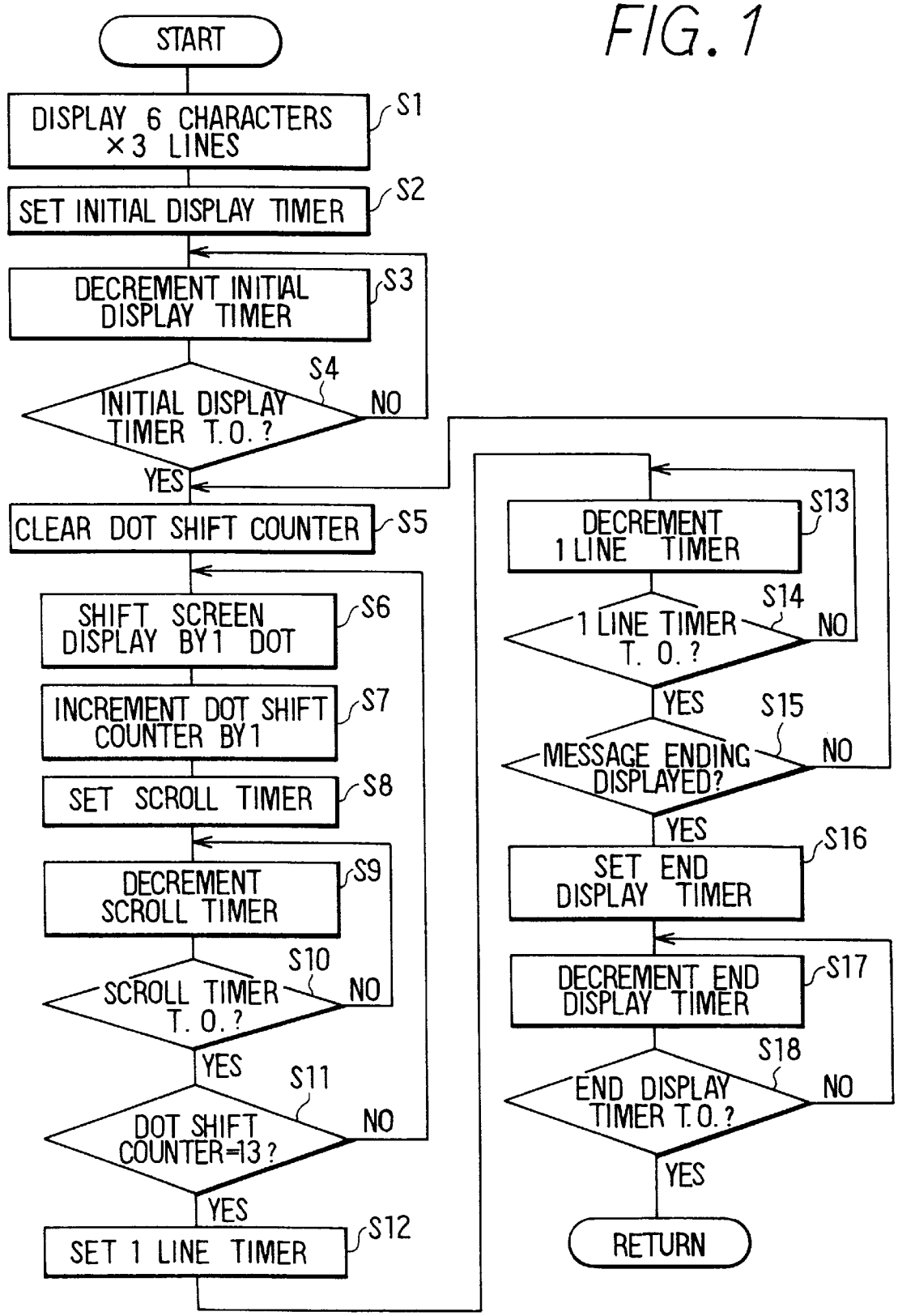
FIG. 1 is a flow diagram showing operating methodology of a terminal display according to one embodiment of the invention.

According to the present embodiment, the scroll display speed is changed by changing the value set for the scroll timer at Step S8 in the flow diagram shown in FIG. 1. When the speed is fast (the user firmly grips the tactile sensor 8), the value set for the scroll timer is set at 20 ms as described above. When the speed is to be slowed down (the user does not firmly grip the tactile sensor 8), the value set for the scroll timer is set at 60 ms for example.

Thus, the user can change the message scrolling speed between the relative fast speed of 1 dot per every 20 ms and the relatively slow speed of 1 dot per every 60 ms freely while watching the display on the display section 3 by manipulating the tactile sensor 8.

Thus, the present embodiment allows the user to read a long text message readily without having to make cumbersome control manipulations such as line feed and page feed one by one. The present invention also enables the scroll display to be readily readable to the user because the user is allowed to change the scroll display speed freely while simultaneously reading the character message on the display 3.

The present embodiment also simplifies the manipulation required for changing the display scrolling speed by allowing the display scroll speed to be changed by manipulation of the tactile sensor 8 and by locating the tactile sensor 8 on the user grip region on the body 2 to make it operative based on the firmness of the user's grip.

Also, because the scroll display is paused for a certain period of time every time the movement of one line on the display is completed in the present embodiment, the display may be made more readable than if the screen was scrolled continuously. It is also possible to obtain an advantage that when the display 3 is an LCD, the display can be made without changing the contrast because the display is made fully dense when the display is stopped.

It is noted that although the embodiment described above has been arranged so that the display scroll speed can be varied, it is possible to set the scrolling speed at a slower speed during normal operation and to increase the speed when instructed to do so by the user, or to change the scroll speed in multi-steps of three or more steps. It is also possible to set the initial scroll display speed freely and to be able to change the initially-set speed.

Further, although the embodiment described above has been arranged so that the scroll speed can be changed when the tactile sensor is touched, the scroll speed may alternately be switched via a one-touch operation, or via a plurality of steps in correspondence to a number of times of manipulation. The tactile sensor may also be located in other areas on the telephone. Further, it is also possible to change the scrolling speed through key manipulation instead of through the tactile sensor.

In addition, although the embodiment described above has been arranged so that the scrolling text may be paused in 1 dot increments, the time of pause may be changed. It is more effective if the change of the display scrolling time of one dot is carried out together with the change of the pause time. The pause time per line need not always be carried out. Also, it is also possible to provide the display pause time for every two lines of scrolled text, for every three lines (one page) of scrolled text. The pause time may be also what is added with the surrounding temperature.

Although the invention has been applied to the portable telephone in the embodiment described above, the invention may be also applied not only to a PHS terminal equipment but also to communication terminals in general having a text message receiving function, such as personal computers and PDA terminals. The text message is not limited to mail and may be text message data sent by various information services. Thus, the present invention may be embodied in various forms.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A communication terminal, comprising:
   a transceiver;
   a display having a horizontal and a vertical direction, the display provided in the transceiver and displaying multiple lines of a text message at one time, the multiple lines displayed in the horizontal direction and paused for a first predetermined time, the multiple lines stacked in the vertical direction with respect to the display;
   a controller that scrolls the text message on the display in the vertical direction to eliminate lines of said text.

message from one vertical side of said display and to add lines of said text message at an opposite vertical side of said display; and an input device that generates a signal to the controller responsive to actuation by a user, said controller responsive to said signal to change scrolling of said text message between two automatic non-zero scrolling speeds.

2. The communication terminal of claim 1, wherein the input device is a tactile sensor responsive to gripping by the user.

3. A method for displaying lines of a text message on a display of a transceiver for a communication terminal, the display having a horizontal and a vertical direction, comprising:

displaying plural lines of the text message in the horizontal direction, said plural lines being paused for a first predetermined time and stacked in the vertical direction of the display;

automatically scrolling the text message on the display in the vertical direction at a first non-zero scrolling speed to eliminate lines of the text message at one vertical side of the display and add lines of the text message at an opposite vertical side of the display;

actuating a input device by a user to change from the first scrolling speed to a second non-zero scrolling speed; and automatically scrolling the text message on the display in the vertical direction at the second non-zero scrolling speed to eliminate lines of the text message at one vertical side of the display and add lines of the text message at an opposite vertical side of the display.

4. The method as claimed in claim 3, further comprising the step of pausing the plural lines of text for a first predetermined time during the displaying step.

5. The method as claimed in claim 3, further comprising a step of pausing the plural lines of text either after scrolling the text message a predetermined distance on said display or for a second predetermined amount of time.

6. The method as claimed in claim 3, wherein said second predetermined amount of time is shorter than said first predetermined amount of time.

7. The method as claimed in claim 5, wherein said predetermined distance is one line of text.

\* \* \* \* \*